United States Patent
Liu et al.

(10) Patent No.: US 8,214,818 B2
(45) Date of Patent: Jul. 3, 2012

(54) METHOD AND APPARATUS TO ACHIEVE MAXIMUM OUTER LEVEL PARALLELISM OF A LOOP

(75) Inventors: Li Liu, Beijing (CN); Buqi Cheng, Beijing (CN); Gansha Wu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1342 days.

(21) Appl. No.: 11/897,468

(22) Filed: Aug. 30, 2007

(65) Prior Publication Data

US 2009/0064120 A1 Mar. 5, 2009

(51) Int. Cl.
G06F 9/45 (2006.01)
(52) U.S. Cl. ......... 717/160; 717/152; 717/155; 717/156
(58) Field of Classification Search ................ None
See application file for complete search history.

(56) References Cited

U.S. PATENT DOCUMENTS

| | | | | |
|---|---|---|---|---|
| 5,442,790 | A * | 8/1995 | Nosenchuck | 717/155 |
| 6,374,403 | B1 * | 4/2002 | Darte et al. | 717/161 |
| 6,772,415 | B1 * | 8/2004 | Danckaert et al. | 717/161 |
| 7,689,980 | B2 * | 3/2010 | Du et al. | 717/160 |
| 7,770,162 | B2 * | 8/2010 | Liu et al. | 717/151 |
| 2005/0198627 | A1 * | 9/2005 | Du et al. | 717/160 |
| 2007/0079281 | A1 * | 4/2007 | Liao et al. | 717/106 |
| 2007/0079303 | A1 * | 4/2007 | Du et al. | 717/151 |
| 2007/0157184 | A1 * | 7/2007 | Liu et al. | 717/144 |

OTHER PUBLICATIONS

Utpal Banerjee, Loop Parallelization Loop Transformations for Restructuring Compilers, published by Kluwer Academic Publishers, 1994, pp. 1-5, 124-125, 134, 141-143 and 147-150.*
Wolf et al., A Loop Transformation Theory and an Algorithm to Maximize Parallelism, publised by IEEE Transactions on Parallel and Distributed Systems, vol. 2, No. 4, Oct. 1991, pp. 452-471.*
Chang et al., Increasing Parallelism of Loops with the Loop Distribution Technique, Proceedings of National Computer Symposium 1995, pp. 568-575.*
Liu et al., A Basis Approach to Loop Parallelization and Syncronization, published by IEEE 1994, pp. 326-332.*
Darte et al., Loop Shifting for Loop Cpmpaction, published by Springer-Verlag Berline Heidelberg 2000, pp. 415-431.*
Kennedy et al., Maximizing Loop Parallelism and Improving Data Locality via Loop Fusion and Distribution, published in Languages and Compilers for Parallel Computing, 1994, pp. 1-20.*
Jingling Xue, Unimodular Transformations of Non-Perfectly Nested Loops, pblished in Parallel Computing 1997, pp. 1-28.*
Sass et al., Enabling Unimodular Transformations, published by IEEE 1994, pp. 753-762.*
J. Ramanujam, Beyond Unimodular Transformations, published by Kluwer Academic Publishers, The Journal of Supercomputing, 9, 1995, pp. 365-389.*

* cited by examiner

Primary Examiner — Tuan Dam
Assistant Examiner — Zheng Wei
(74) Attorney, Agent, or Firm — Trop, Pruner & Hu, P.C.

(57) ABSTRACT

In one embodiment, the present invention includes a method for constructing a data dependency graph (DDG) for a loop to be transformed, performing statement shifting to transform the loop into a first transformed loop according to at least one of first and second algorithms, performing unimodular and echelon transformations of a selected one of the first or second transformed loops, partitioning the selected transformed loop to obtain maximum outer level parallelism (MOLP), and partitioning the selected transformed loop into multiple sub-loops. Other embodiments are described and claimed.

12 Claims, 5 Drawing Sheets

FIG. 1

```
for J = 3 to 10000. step 1
  for K = 5 to 10000. step 1
    A[J, K] = B[J-1, K] + C[J-3, K-5]      <S1>
    B[J, K] = A[J-1, K-2] + C[J, K-3]      <S2>
    C[J, K] = A[J-1, K+1] + B[J-2, K+1]    <S3>
```

FIG. 2C distance_a[S2-S1]+distance_a[S1-S2]=(2,2)

distance_a[S1-S3]-distance_a[S1-S2]-distance_a[S2-S3]=(-2,-2)

distance_a[S3-S1]+distance_a[S1-S2]+distance_a[S2-S3]=(6,6)

distance_a[S3-S2]+distance_a[S2-S3]=(2,2)

FIG. 2D $$B = \begin{pmatrix} 2 & 2 \\ -2 & -2 \\ 6 & 6 \\ 2 & 2 \end{pmatrix} \Rightarrow \begin{cases} B_2 = (2\ 2) \\ U_1 = \begin{pmatrix} 1 & 0 & 0 & 0 \\ 1 & 1 & 0 & 0 \\ -3 & 0 & 1 & 0 \\ -1 & 0 & 0 & 1 \end{pmatrix} \end{cases}$$

FIG. 3A $$U_1 \times A = \begin{pmatrix} 1 & 0 & 1 & 0 & 0 & 0 \\ 0 & 1 & 1 & -1 & 0 & 0 \\ -2 & 0 & -3 & 1 & 1 & 0 \\ -1 & 0 & -1 & 1 & 0 & 1 \end{pmatrix} \Rightarrow U_2 = \begin{pmatrix} 1 & 0 & 0 & 0 & -1 & 0 \\ 0 & 1 & 0 & 0 & -1 & 1 \\ 0 & 0 & 0 & 0 & 1 & 0 \\ 0 & 0 & 0 & 0 & 0 & 1 \\ 2 & 0 & 1 & 0 & 1 & -1 \\ 1 & 0 & 0 & 1 & 0 & -1 \end{pmatrix}$$

FIG. 3B $$C_2 = \begin{pmatrix} 1 \\ 0 \\ 0 \\ 0 \\ x1 \\ x2 \end{pmatrix}$$

FIG. 3C $$U_2 \times C_2 \times B_2 \geq 0 \Rightarrow \begin{cases} 1-x1 \geq 0 \\ -x1+x2 \geq 0 \\ x1 \geq 0 \\ x2 \geq 0 \\ 2+x1-x2 \geq 0 \\ 1-x2 \geq 0 \end{cases} \Rightarrow \begin{cases} \begin{cases} x1=0 \\ x2=0 \end{cases} \Rightarrow distance\_a = \begin{pmatrix} 2 & 2 \\ 0 & 0 \\ 0 & 0 \\ 0 & 0 \\ 4 & 4 \\ 2 & 2 \end{pmatrix} \\ \begin{cases} x1=0 \\ x2=1 \end{cases} \Rightarrow distance\_a = \begin{pmatrix} 2 & 2 \\ 2 & 2 \\ 0 & 0 \\ 2 & 2 \\ 2 & 2 \\ 0 & 0 \end{pmatrix} \\ \begin{cases} x1=1 \\ x2=1 \end{cases} \Rightarrow distance\_a = \begin{pmatrix} 0 & 0 \\ 0 & 0 \\ 2 & 2 \\ 2 & 2 \\ 4 & 4 \\ 0 & 0 \end{pmatrix} \end{cases}$$

FIG. 3D $$\begin{pmatrix} & 1 & 2 & 3 & 4 & 5 & 6 \\ & 1 & 0 & 1 & 0 & 0 & 0 \\ & -1 & 1 & 0 & -1 & 0 & 0 \\ & 1 & 0 & 0 & 1 & 1 & 0 \\ & 0 & 0 & 0 & 1 & 0 & 1 \end{pmatrix} \times distance\_a = \begin{pmatrix} 2 & 2 \\ -2 & -2 \\ 6 & 6 \\ 2 & 2 \end{pmatrix} \Rightarrow distance\_a = \begin{pmatrix} 0 & 0 \\ -2 & -2 \\ 2 & 2 \\ 0 & 0 \\ 6 & 6 \\ 2 & 2 \end{pmatrix}$$

$$\begin{array}{c c} & \begin{array}{c c c} S1 & S2 & S3 \end{array} \\ \begin{array}{c} S1 \\ S2 \\ S3 \end{array} & \begin{pmatrix} & 1 & 2 \\ 3 & & 4 \\ 5 & 6 & \end{pmatrix} \end{array}$$

FIG. 3F

FIG. 3E $$\begin{pmatrix} & 1 & 2 & 3 & 4 & 5 & 6 \\ & 0 & 1 & 1 & -1 & 0 & 0 \\ & 1 & -1 & 0 & 1 & 0 & 0 \\ & 0 & 1 & 0 & 0 & 1 & 0 \\ & 0 & 0 & 0 & 1 & 0 & 1 \end{pmatrix} \times distance\_a = \begin{pmatrix} 0 & 0 \\ 2 & 2 \\ 4 & 4 \\ 2 & 2 \end{pmatrix} \Rightarrow distance\_a = \begin{pmatrix} 2 & 2 \\ 0 & 0 \\ 0 & 0 \\ 0 & 0 \\ 4 & 4 \\ 2 & 2 \end{pmatrix}$$

FIG. 3G

```
for J = 2 to 10001, step = 1
    for K = 5 to 10001, step = 1
        if (J>2 and J<10001 and K<10001)
            A[J, K] = B[J-1, K] + C[J-3, K-5]
        if (J>3 and K < 10001)
            B[J-1, K] = A[J-2, K-2] + C[J-1, K-3]
        if (J < 10000 and K > 5)
            C[J+1, K-1] = A[J, K] + B[J-1, K]
```

FIG. 3H

```
for P = -9999 to 9996, step = 1       // parallel
    for I = 0 to 1, step = 1           // parallel
        for K = MAX(2-P, 5)+I to MIN(10001-P, 10001), step 2
            if (P+K>2 and P+K<10001 and K<10001)
                A[P+K, K] = B[P+K-1, K] + C[P+K-3, K-5]
            if (P+K>3 and K<10001)
                B[P+K-1, K] = A[P+K-2, K-2] + C[P+K-1, K-3]
            if (P+K<10000 and K>5)
                C[P+K+1, K-1] = A[P+K, K] + B[P+K-1, K]
```

METHOD AND APPARATUS TO ACHIEVE MAXIMUM OUTER LEVEL PARALLELISM OF A LOOP

BACKGROUND

Multiprocessor systems are becoming more widespread in the computer industry. As such, parallel execution of code in the multiprocessors can be used to take advantage of performance gains. To optimize performance on multiprocessors, software programs need to be parallelized to take full advantage of the available parallel execution.

Generally, loops in a software program take additional time in the execution of a program. A technique to reduce this time is loop transformation. Loop transformations are used to increase the parallelism of the software program in modern compilers. Currently, there are many kinds of loop transformations, such as fusion, fission, blocking, shifting, greatest common divisor (GCD) transformation and affine partitioning.

Loop shifting, in particular, involves moving operations from one iteration of the loop body to a different iteration of the loop body. It does this by shifting a set of operations from the beginning of the loop body to the end of the loop body. A copy of these operations is also placed in the loop head or prologue. Loop shifting shifts a set of operations one at a time, thereby exposing just as much parallelism as can be exploited by the available resources. Parallelizing transformations can then operate on the shifted operations to further compact the loop body. Loop shifting can expose parallelism in order to increase the performance, area, and resource utilization of a multiprocessor.

BRIEF DESCRIPTION OF THE DRAWINGS

FIGS. 3A-3I are an example of solving shifting expressions in accordance with various algorithms in accordance with embodiments of the present invention.

DETAILED DESCRIPTION

Embodiments of the invention may be used to enable a type of loop shifting known as statement shifting. Statement shifting is implemented by solving basic and dependence equation groups that are built according to a data dependence graph (DDG) of a loop. In statement shifting, every statement in the loop has its own transformation mapping. The equation groups provide accurate loop transformation constraints for each statement in the loop. By way of the equations groups, statement shifting explores parallel chances for other loop transformation techniques.

Figure 1:
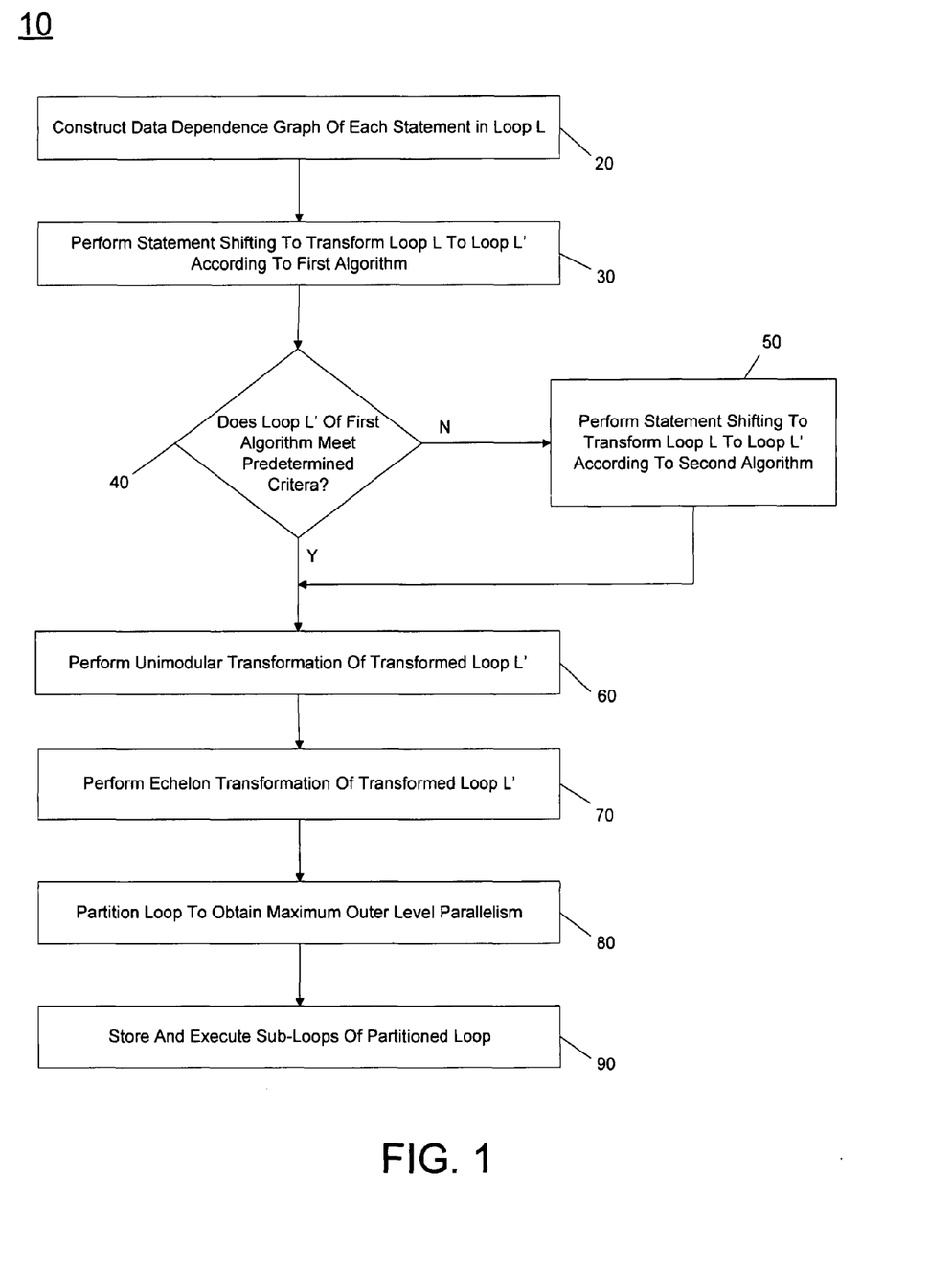
FIG. 1 is a flow diagram of a method in accordance with one embodiment of the present invention.

Referring now to FIG. 1, shown is a flow diagram of a method in accordance with one embodiment of the present invention. As shown in FIG. 1, method 10 may be used to perform statement shifting in the process of determining a maximum outer level parallel (MOLP) of a loop. In so doing, the loop may be partitioned to obtain a transformed loop having maximum outer level parallelism in order to improve runtime performance. As shown in FIG. 1, method 10 may begin by constructing a DDG for the loop that is to undergo loop transformation (block 20). The DDG is constructed by representing each statement in the loop as a node, and the dependencies between each statement are represented as edges with corresponding weights.

Next, statement shifting may be performed to transform an original loop L to a transformed loop L' according to a first algorithm (block 30). Further details of the first algorithm (also referred to herein as Algorithm A) will be discussed further below. At diamond 40 it may be determined whether loop L' meets certain predetermined criteria. As will be described further below, such criteria may relate to whether certain integer values can be obtained from the algorithm. If so, control may pass to block 60. Otherwise, control passes to block 50. At block 50, a second algorithm (referred to herein as Algorithm B), details of which are described further below, may be performed to enable statement shifting to transform loop L into a transformed loop L'.

From both of block 50 and diamond 40, control passes to block 60, where unimodular transformation of the transformed loop L' may be performed. Then an echelon transformation of the transformed loop L' may be performed at block 70.

The transformed loop may then be partitioned to obtain maximum outer loop parallelism (block 80). Finally, sub-loops of the partitioned loop may be stored, e.g., in a code cache or another such location to enable later execution of the sub-loops (block 90). While the scope of the present invention is not limited in this regard, method 10 may be performed by a parallel compiler, in some embodiments.

Before describing partitioning algorithms, statement shifting, which is an indirect technique to explore more parallel opportunities for other transformations, is described. For a given loop, there could be multiple solutions to the statement shifting. Sometimes it is possible to get the optimal solution for specific transformations, but the general question "which statement shifting is best" is still not answered. To find out the best solution, embodiments may determine a maximum outer level parallelism determined by a loop, and two statement shifting based algorithms may be implemented to achieve maximum outer level parallelism of the loop.

The basic theory of statement shifting is that the distance vectors of dependences in the DDG of a loop can be changed by shifting data accesses in the loop to improve the parallelism, while the sum of the distance vectors in any undirected dependence circle will not be changed.

In statement shifting, the dependence in the undirected spanning forest (USF) of the loop's DDG is called basic dependence and other dependences are called common dependences. According to the graph theory, we can know each common dependence is inside a unique undirected circle in which all other dependences are in the USF. This circle is called a basic undirected circle (BUC).

In statement shifting, the dependence distance vectors in edges of BUC determine a dependence equation. In the following equation, D is a data dependence edge between statements in the DDG. Distance_b and distance_a are arrays that represent distance vectors of all the dependence distances before and after statement shifting, respectively. Specifying a dependence direction as positive direction, for any dependence D in the DDG, if the direction of D is positive, the coefficient is 1, and if the direction of D is negative, the coefficient is −1. In this way, a dependence equation can be obtained for a BUC as follows:

$$\sum_{i=1\ldots m} \text{distance\_b}[D_i] \times a_i = B_b \quad \text{(Eq. 1)}$$

where $D_i$ is data dependence, distance_b is an array which records distance vectors before statement shifting, m is the number of dependences in the BUC, and $a_i$ is an integer coefficient which is 1 or −1, $B_b$ is the vector sum result of all the distance vectors with their coefficients and is a known constant vector. From Eq. 2, for the BUC after statement shifting, we can get following equation:

$$\sum_{i=1\ldots m} \text{distance\_a}[D_i] \times a_i = B_a \quad \text{(Eq. 2)}$$

where distance_a is an array which records distance vectors after statement shifting. $B_a$ is defined the same as $B_b$, and proved that $B_a$ is identically equal to $B_b$.

All the (Eq. 2) equations in a DDG construct a dependence equation group. Any nonnegative solution to the dependence equation group can be deemed as a statement shifting solution, which we call as shifting expression. It can be proved that one shifting expression can be transformed to another by unimodular transformation step by step. So any shifting expression based loop transformation is a legal transformation.

Figure 2A:
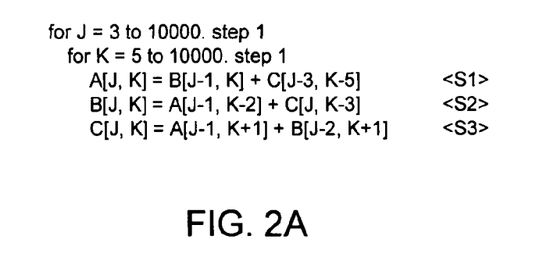
FIGS. 2A-2D are an example of creating a dependence equation group in accordance with one embodiment of the present invention.
Figure 2B:
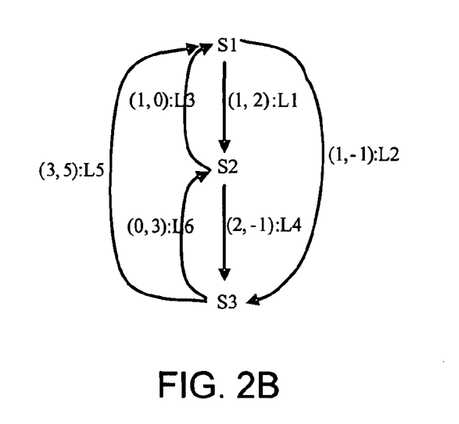
Figure 2C:
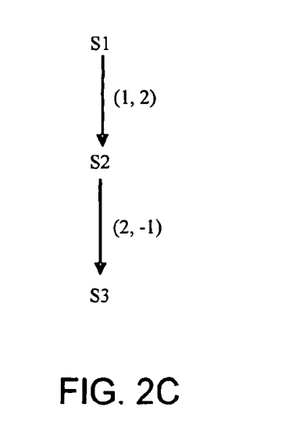
Figure 2D:
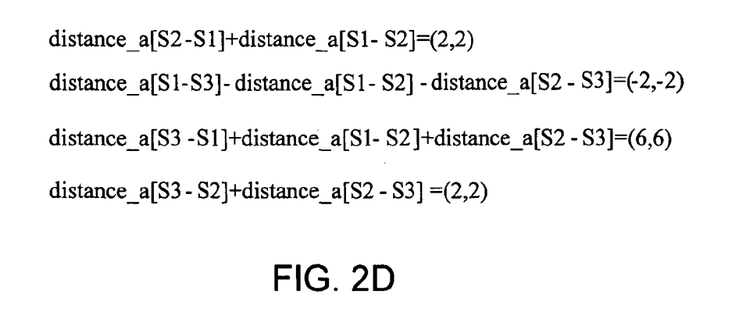

FIGS. 2A-2D is an example of creating a dependence equation group in accordance with an embodiment of the present invention. FIG. 2A is an original nested loop and FIG. 2B is its DDG. FIG. 2C is a USF of the DDG in FIG. 2B, and FIG. 2D is the dependence equation group determined by this USF, and as shown in FIG. 2D there are four equations.

In the following sections, we focus on the outer level parallelism. Without loss of generality, we assume that where there are enough processors, the execution cycle of any instruction is constant and the synchronization cost can be ignored. At this time, the speedup of outer level parallel partition is determined by the biggest sub-loop. In other words, the outer level parallel partition which produces most sub-loops can achieve maximum outer level parallelism.

For a loop L, after partitioning it into sub-loops, if there is no dependence between these sub-loops, this loop partition is called the outer level parallel partition of L. For loop L, whose distance matrix is denoted as D, after any outer level parallel partition according to D, the maximum number of sub-loops of loop L is called as maximum outer level parallelism determined by distance matrix D, abbreviated as MOLP(D). Specifying $D_1$ and $D_2$ are 2 distance matrixes, $U_1$ and $U_2$, which are two unimodular matrixes, if $D_1 = U_1 \times D_2 \times U_2$, we call $D_1$ is similar with $D_2$, denoted as $D_1 \sim D_2$. The transformation from $D_1$ to $D_2$ is called a similar transformation. In an m-dimensional loop L, $D_1$ is distance matrix of L, and $D_2$ is a similar matrix of $D_1$, we can draw a conclusion that MOLP($D_1$)= MOLP($D_2$) (Corollary 1).

Each iteration of L can be viewed as a unique point in an m-dimensional space, and it can be mapped to a unique m-dimensional loop index vector. After we draw a directed edge between any two dependent points, we get an m-dimensional dependent pointed space, i.e., a point dependence space. MOLP is determined by the point dependence space. After transforming $D_1$ to $D_2$, the mapping between loop index vector and points is changed, but the point dependence space is not changed, so similar transformation does not change the MOLP and MOLP($D_1$)=MOLP($D_2$).

Specifying A and B are 2 m×n integer matrixes, and k=MIN(m, n), if A~B, the GCD of determinant of all k×k sub-matrixes of A is the same as the GCD of determinant of all the k×k sub-matrixes of B (Lemma 1). For an n×m distance matrix D whose rank is m, the GCD of the determinant of all m×m sub-matrix of D is referred to as the full-ranked determinant GCD of D, or FRD_GCD(D). If D is an n×m distance matrix whose rank is m, MOLP(D)=FRD_GCD(D) (Corollary 2).

Specifying T is an upper-triangle integer square matrix whose FRD_GCD(T) is 1, it is similar to the identity matrix E. There is no MOLP of identity matrix, which means MOLP (E)=1, according to Corollary 1, MOLP(T)=1. It can be proved that if we can get FRD_GCD(D) outer level paralleled sub-loops, the FRD_GCD of distance matrix of each sub-loops will be 1, and this distance matrix is similar to $$\begin{pmatrix} E \\ 0 \end{pmatrix},$$

where E is an identity matrix. Since $$MOLP\left(\begin{pmatrix} E \\ 0 \end{pmatrix}\right) = 1,$$

so MOLP(D)≦FRD_GCD(D).

At the same time, with echelon transformation, we can transform D to a similar integer echelon C where there are Rank(D) positive rows in the top and other rows are 0. According to Lemma 1, FRD_GCD(D)=FRD_GCD(C). According to the definition of MOLP(D), since echelon transformation provides a partition method, we can get MOLP (D)≧ FRD_GCD(D). So we can draw a conclusion that, FRD_GCD is the MOLP determined by a full ranked distance matrix.

In loop L, when both distance matrix and DDG are known, statement shifting can be applied. Expressing shifting expression as A×distance_a=B, where A is the m×n coefficient matrix and B is a known integer matrix, we get the following 2 corollaries. After any outer level parallel partition, the maximum number of sub-loops of loop L, is called as maximum outer level parallelism of L, abbreviated as MOLP(L). Accordingly, when a loop partition achieves MOLP(L), there is no MOLP for any sub-loop, and MOLP(L)=MOLP(B) (Corollary 3).

According to the feature of statement shifting, in any shifting expression, MOLP(B) is the same. We can construct a new equations group which is expressed as, $$\begin{pmatrix} A \\ A' \end{pmatrix} \times \text{distance\_a} = \begin{pmatrix} B \\ B' \end{pmatrix},$$

where $$\begin{pmatrix} A \\ A' \end{pmatrix}$$

is a unimodular matrix, so $$MOLP(\text{distance\_a}) = MOLP\left(\begin{pmatrix} B \\ B' \end{pmatrix}\right) \leq MOLP\left(\begin{pmatrix} B \\ 0 \end{pmatrix}\right) = MOLP(B),$$

and MOLP(L)=MOLP(distance_a)≦MOLP(B). From Algorithm B, we know that we can always find a solution of statement shifting, which is $$\text{distance\_a} = E_{x1} \times \begin{pmatrix} E_2 \\ 0 \end{pmatrix} \times B,$$

where $E_{x1}$ is an n×n identity matrix after column interchanging and $E_2$ is a m×m identity matrix, so $$\text{distance\_a} \sim \begin{pmatrix} E_2 \\ 0 \end{pmatrix} \times B = \begin{pmatrix} B \\ 0 \end{pmatrix},$$

and MOLP(L)=MOLP(B). Corollary 3 connects maximum outer level parallelism of a loop with maximum outer level parallelism of a distance matrix by statement shifting.

To find the maximum outer level parallelism of a loop, we firstly discuss the maximum outer level parallelism determined by the distance matrix of the loop. With statement shifting, similar distance matrix based loop transformations are set forth in Algorithms A and B. Corollary 3 gives out constraints for this transformation.

Given a shifting expression A×distance_a=B, where A is the m×n coefficient matrix and B is a known integer matrix. Specifying $B_1=U_1 \times B$, where $B_1$ is an echelon matrix and $U_1$ is a unimodular matrix, and the number of the nonzero rows in $B_1$ is Rank(B); specifying $B_2=(E_1R)\times B_1$, where $E_1$ is a Rank(B)×Rank(B) identity matrix, R is a random matrix. The necessary and sufficient conditions to achieve MOLP(B) are: (1) every row vector in distance_a is nonnegative, and (2) distance_a=$C_1 \times B_2$ and $$U_1 \times A \times C_1 = \begin{pmatrix} E_1 \\ 0 \end{pmatrix},$$

where $C_1$ is an integer matrix (Corollary 4). Corollary 4 gives out the condition and the equations to find out the MOLP of the loop's distance matrix. Based on it, Algorithms A and B may find one solution of shifting expressions that can satisfy the upper 2 conditions.

Algorithm A operations to obtain the MOLP(L) by solving the statement shifting equation group according to the conditions in Corollary 4 (m, n, A, $B_2$, $E_1$ and $U_1$ have the same definitions as in Corollary 4): (1) solve $B_2$ and $U_1$; (2) specifying $E_2$ is a m×m identity matrix, solve a unimodular matrix $U_2$, which satisfies the equation $U_1 \times A \times U_2=(E_2 0)$; (3) construct an n×Rank($B_2$) integer matrix $$C_2 = \begin{pmatrix} E_2 \\ X_1 \end{pmatrix} \times \begin{pmatrix} E_1 \\ 0 \end{pmatrix},$$

where every element in $X_1$ is unknown; and (4) construct an inequalities group $U_2 \times C_2 \times B_2 \geq 0$, and find an integer solution of this inequalities group. $U_2 \times C_2 \times B_2$ is one solution of shifting expression which can achieve MOLP(L).

In the third step of Algorithm A, we can construct $C_2$ as $$\begin{pmatrix} E_1 \\ X_2 \end{pmatrix},$$

where $X_2$ is a unknown integer matrix where every element is unknown, then there are more unknown elements in $C_2$ and there are more inequalities. But it is unnecessary, because when we construct $$C_2 \text{ as } \begin{pmatrix} E_2 \\ D \end{pmatrix} \times \begin{pmatrix} E_1 \\ 0 \end{pmatrix},$$

we can find a solution of shifting expression which achieves MOLP(L).

FIGS. 3A-3D is an example of solving the shifting expression in FIG. 2D by Algorithm A. FIG. 3A is the first step, after this step, $B_2$ and $U_1$ are solved. FIG. 3B is the second step, after this step, $U_2$ is solved. FIG. 3C is the third step, where the integer matrix $C_2$ is constructed, and there are only 2 unknown integers in $C_2$. FIG. 3D is the fourth step, in which the inequalities group is built and all its integer solutions are found and thus 3 solutions of the shifting expression are found.

The problem of Algorithm A is whether the inequalities group will always has integer solution. Algorithm B gives out another way which can achieve MOLP(L) by solution searching. It can be proofed that Algorithm B can always find solution; this means Algorithm A always has an integer solution.

Accordingly Algorithm B, which is a MOLP(L) searching algorithm, is as follows: (1) after setting the distance_a of all basic dependences to 0, we get the only solution of current shifting expression; (2) if each row vector in distance_a is nonnegative, the solution which can achieve MOLP(L) is found, and Algorithm B ends; otherwise if at least one row vector in distance_a is negative; (3) transform the shifting expression step by step, and each step is called as adjustment. In an adjustment, firstly, specifying D1 is the common dependence whose distance_a is smallest, find out a basic dependence D2 from the dependences which are in the same BUC with D1, and the directions of D1 and D2 are opposite in this BUC, secondly, change D1 to basic dependence and D2 to common dependence and then return to step 1.

Specifying $E_2$ is a Rank(A)×Rank(A) identity matrix, from the first step of Algorithm B, we can know that, $A \times E_{x1} = (E_2 D_1)$ and distance $$\text{distance\_a} = E_{x1} \times \begin{pmatrix} E_2 \\ 0 \end{pmatrix} \times B,$$

where $E_{x1}$ is an identity matrix after column interchanging, $D_1$ is an known integer matrix. So $$C_1 = E_{x1} \times \begin{pmatrix} E_2 \\ 0 \end{pmatrix} \times U_1^{-1} \times \begin{pmatrix} E_1 \\ 0 \end{pmatrix},$$

$$U_1 \times A \times C_1 = U_1 \times A \times E_{x1} \times \begin{pmatrix} E_2 \\ 0 \end{pmatrix} \times U_1^{-1} \times \begin{pmatrix} E_1 \\ 0 \end{pmatrix} =$$

$$U_1 \times (E_2 \ D_1) \times \begin{pmatrix} E_2 \\ 0 \end{pmatrix} \times U_1^{-1} \times \begin{pmatrix} E_1 \\ 0 \end{pmatrix} = \begin{pmatrix} E_1 \\ 0 \end{pmatrix}.$$

As a result, distance_a solved from the first step satisfies the constraint conditions in the second constraint conditions of MOLP(L). The second and third steps make sure the solution matches the first constraint of MOLP(L).

FIGS. 3E-3I is an example of Algorithm B. FIG. 3E shows the numbers of the dependences in FIG. 2B in matrix form, where the rows represent the "from" statements and the columns represent "to" statements. FIG. 3F is the solution of the shifting expression in FIG. 2D. Because distance_a[S1-S3]= (−2,−2), this solution obeys condition 1 in Corollary 4. FIG. 3G is the solution after changing common dependence S1-S3 to basic dependence and basic dependence S1-S2 to common dependence, and this solution matches the conditions in the Corollary 4, so it can achieve MOLP(L). We can find that the solution in FIG. 3G is one of the solutions in FIG. 3D. FIG. 3H shows the loop after statement shifting, whose distance matrix is distance_a in FIG. 3G. The statement shifting enables unimodular and echelon transformation to explore outer level parallelism for this loop.

With the statement shifting instructed by Algorithm A or B, the original loop is transformed to a new loop whose distance matrix is similar to the matrix B in the shifting expression. Then, unimodular transformation and echelon transformation can be used to explore parallelism of the new loop. As a result, the maximum outer level parallelism of a loop is achieved. In conclusion, we will achieve MOLP(L) as follows: (1) transform L to L' by statement shifting according to the solution from Algorithms A or B; and (2) transform L' by unimodular and echelon transformation, then partition the loop. FIG. 3I shows the loop after unimodular and echelon transformation, as a result, the outer levels indexed by P and I can be parallelized, and thousands of parallel sub-loops can be achieved.

As chip multiprocessors (CMP) become the mainstream of architecture designs, parallelism becomes of greater interest. Loops take much time in execution of a program, and loop transformation can increase the parallelism of loop execution, so better loop partition can exploit CMP much better. Embodiments of loop partitioning can explore maximum outer level parallelism for a loop, so it can speed up a loop most.

Figure 4:
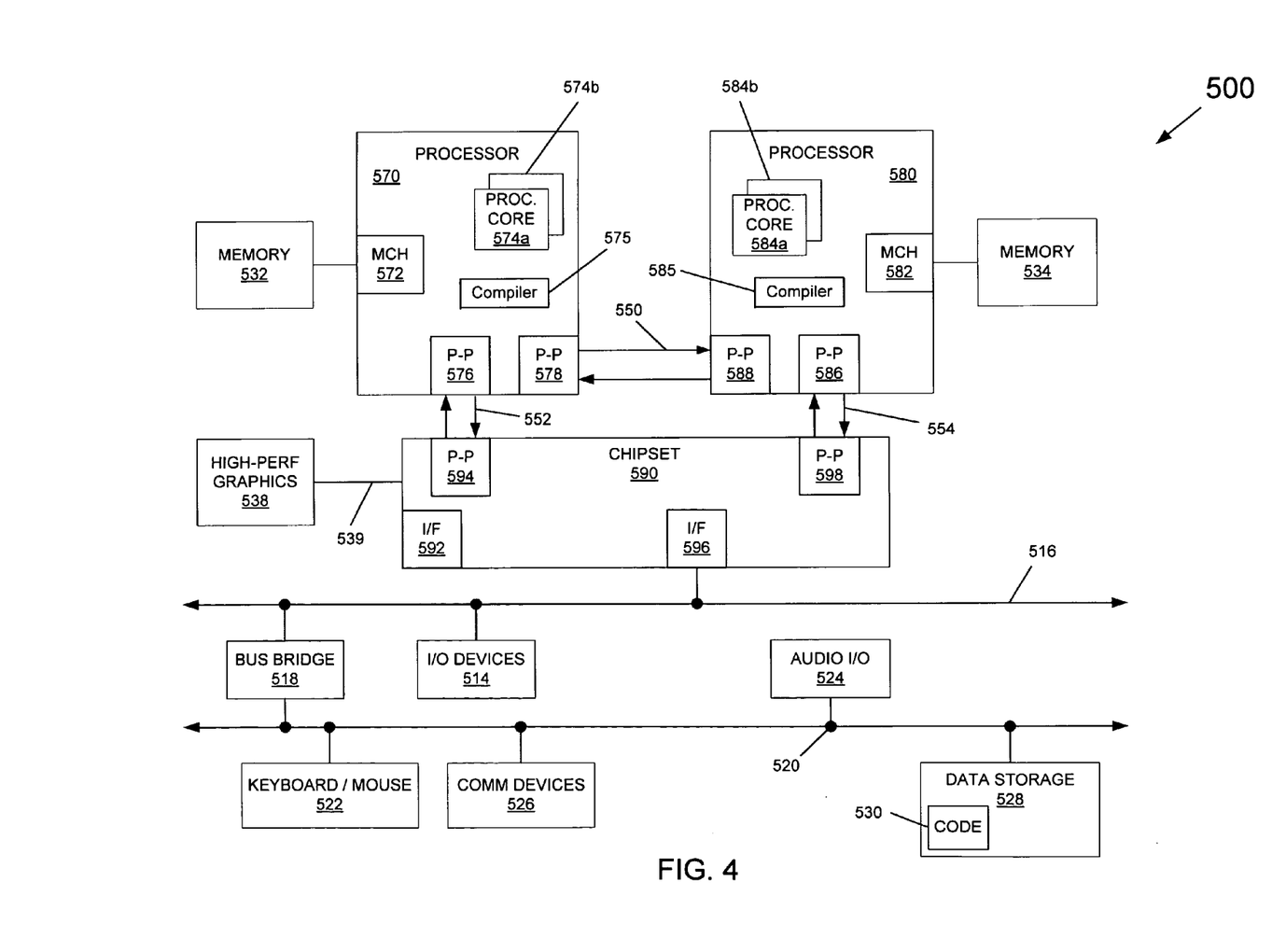
FIG. 4 is a block diagram of a multiprocessor system in which embodiments of the present invention may be implemented.

Embodiments may be suited for many different types of platforms. Referring now to FIG. 4, shown is a block diagram of a multiprocessor system in which embodiments of the present invention may be implemented. As shown in FIG. 4, multiprocessor system 500 is a point-to-point interconnect system, and includes a first processor 570 and a second processor 580 coupled via a point-to-point interconnect 550. However, in other embodiments the multiprocessor system may be of another bus architecture, such as a multi-drop bus or another such implementation. As shown in FIG. 4, each of processors 570 and 580 may be multi-core processors including first and second processor cores (i.e., processor cores 574a and 574b and processor cores 584a and 584b), although other cores and potentially many more other cores may be present in particular embodiments. Furthermore, compilers 575 and 585 may be present in each processor to generate code loops having maximum outer-level parallelism in accordance with an embodiment of the present invention.

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors.

First processor 570 and second processor 580 may be coupled to a chipset 590 via P-P interconnects 552 and 554, respectively. As shown in FIG. 4, chipset 590 includes P-P interfaces 594 and 598. Furthermore, chipset 590 includes an interface 592 to couple chipset 590 with a high performance graphics engine 538 via a bus 539.

As shown in FIG. 4, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A method comprising:
   constructing a data dependency graph (DDG) for a loop to be transformed, the DDG representing each statement in the loop as a node and dependences between statements as edges with corresponding weights;
   performing statement shifting to transform the loop into a first transformed loop according to a first algorithm;

determining whether the first transformed loop meets predetermined criteria, and performing statement shifting to transform the loop into a second transformed loop according to a second algorithm if the first transformed loop does not meet the predetermined criteria;

performing a unimodular transformation and an echelon transformation of a selected one of the first or second transformed loops, and partitioning the selected transformed loop into a plurality of sub-loops to obtain maximum outer level parallelism (MOLP); and storing the plurality of sub-loops in a storage medium, wherein the predetermined criteria for the first algorithm include whether an inequalities group of a second unimodular matrix ($U_2$) multiplied by an integer matrix ($C_2$) and a second echelon matrix ($B_2$) has an integer solution.

2. The method of claim 1, wherein the first algorithm includes: solving the second echelon matrix ($B_2$) according to ($E_1R$)×$B_1$, where $E_1$ is a Rank(B)×Rank(B) identity matrix, R is a random matrix and $B_1$ is a first echelon matrix, and wherein Rank(B) corresponds to a number of non-zero rows in $B_1$.

3. The method of claim 2, wherein the first algorithm further includes solving a first unimodular matrix ($U_1$) according to $B_1=U_1\times B$, where B is a known integer matrix.

4. The method of claim 3, wherein the first algorithm further includes solving the second unimodular matrix ($U_2$) according to $U_1\times A\times U_2=(E_2 0)$, where A is a m×n coefficient matrix, and $E_2$ is a m×m identity matrix.

5. The method of claim 4, wherein the first algorithm further includes:

constructing a n×Rank($B_2$) integer matrix ($C_2$) equal to $$\begin{pmatrix} E_2 \\ X_1 \end{pmatrix} \times \begin{pmatrix} E_1 \\ 0 \end{pmatrix},$$

wherein each element in $X_1$ is unknown; and constructing the inequality group and finding the integer solution thereto.

6. The method of claim 1, wherein the second algorithm includes:

setting a distance array of all basic dependences of the loop to zero;

determining if each row vector in the distance array is non-negative; and returning a result that achieves the maximum outer level parallelism if each of the row vectors is non-negative.

7. The method of claim 6, wherein the second algorithm further includes:

if at least one of the row vectors in the distance array is negative, transforming a shifting expression step by step, by specifying a common dependence whose distance array is smallest;

determining a basic dependence from a plurality of dependences that are in a common basic undirected circle with the common dependence and in which the common dependence and the basic dependence directions are opposed;

changing the common dependence to a basic dependence and changing the basic dependence to a common dependence; and setting the distance array of all basic dependences of the loop to zero.

8. An article comprising a non-transitory machine-accessible medium including instructions that when executed cause a system to:

construct a data dependency graph (DDG) for a loop to be transformed, the DDG representing each statement in the loop as a node and dependences between statements as edges with corresponding weights;

perform statement shifting to transform the loop into a first transformed loop according to a first algorithm;

determine whether the first transformed loop meets predetermined criteria, and perform statement shifting to transform the loop into a second transformed loop according to a second algorithm if the first transformed loop does not meet the predetermined criteria;

perform a unimodular transformation and an echelon transformation of a selected one of the first or second transformed loops, and partition the selected transformed loop into a plurality of sub-loops to obtain maximum outer level parallelism (MOLP);

determine whether an inequalities group of a second unimodular matrix ($U_2$) multiplied by an integer matrix ($C_2$) and a second echelon matrix ($B_2$) has an integer solution; and store the plurality of sub-loops in a storage medium.

9. The article of claim 8, further comprising instructions that when executed enable the system to:

solve the second echelon matrix ($B_2$) according to ($E_1R$)× $B_1$, where $E_1$ is a Rank(B)×Rank(B) identity matrix, R is a random matrix and $B_1$ is a first echelon matrix, and wherein Rank(B) corresponds to a number of non-zero rows in $B_1$.

10. The article of claim 9, further comprising instructions that when executed enable the system to solve a first unimodular matrix ($U_1$) according to $B_1=U_1\times B$, where B is a known integer matrix and solve the second unimodular matrix ($U_2$) according to $U_1\times A\times U_2=(E_2 0)$, where A is a m×n coefficient matrix, and $E_2$ is a m×m identity matrix.

11. A system comprising:

a first processor and a second processor each including multiple cores to execute instructions in parallel;

a memory coupled to the first and second processors, the memory to store instructions that when executed enable the system to construct a data dependency graph (DDG) for a loop to be transformed, the DDG representing each statement in the loop as a node and dependences between statements as edges with corresponding weights, perform statement shifting to transform the loop into a first transformed loop according to a first algorithm, determine whether the first transformed loop meets predetermined criteria, and perform statement shifting to transform the loop into a second transformed loop according to a second algorithm if the first transformed loop does not meet the predetermined criteria, perform a unimodular transformation and an echelon transformation of a selected one of the first or second transformed loops, and partition the selected transformed loop into a plurality of sub-loops to obtain maximum outer level parallelism (MOLP), determine whether an inequalities group of a second unimodular matrix ($U_2$) multiplied by an integer matrix ($C_2$) and a second echelon matrix ($B_2$) has an integer solution and store the plurality of sub-loops in a storage medium.

12. The system of claim 11, wherein the instructions further enable the system to solve the second echelon matrix ($B_2$) according to ($E_1R$)×$B_1$, where $E_1$ is a Rank(B)×Rank(B) identity matrix, R is a random matrix and $B_1$ is a first echelon matrix, and wherein Rank(B) corresponds to a number of non-zero rows in $B_1$ to solve a first unimodular matrix ($U_1$) according to $B_1=U_1\times B$, where B is a known integer matrix and solve the second unimodular matrix ($U_2$) according to $U_1\times A\times U_2=(E_2 0)$, where A is a m×n coefficient matrix, and $E_2$ is a m×m identity matrix.

* * * * *